US011900757B2

(12) United States Patent
Merkel et al.

(10) Patent No.: US 11,900,757 B2
(45) Date of Patent: Feb. 13, 2024

(54) GAMING MACHINE, CONTROL METHOD FOR MACHINE, AND PROGRAM FOR GAMING MACHINE

(71) Applicant: Konami Gaming, Inc., Las Vegas, NV (US)

(72) Inventors: Benjamin Merkel, Henderson, NV (US); John Pariseau, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 334 days.

(21) Appl. No.: 17/336,163

(22) Filed: Jun. 1, 2021

(65) Prior Publication Data

US 2022/0114859 A1 Apr. 14, 2022

Related U.S. Application Data

(63) Continuation of application No. 16/676,181, filed on Nov. 6, 2019, now Pat. No. 11,043,064, which is a continuation of application No. 15/479,112, filed on Apr. 4, 2017, now Pat. No. 10,510,205.

(51) Int. Cl.
*G07F 17/00* (2006.01)
*G07F 17/32* (2006.01)
*G07F 17/34* (2006.01)

(52) U.S. Cl.
CPC ...... *G07F 17/3213* (2013.01); *G07F 17/3227* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 6,186,894 | B1 | 2/2001 | Mayeroff |
| 6,270,411 | B1 | 8/2001 | Gura et al. |
| 6,612,927 | B1 | 9/2003 | Slominay et al. |
| 6,960,133 | B1 | 11/2005 | Marks et al. |
| 7,361,089 | B2 | 4/2008 | Daly et al. |
| 2002/0045474 | A1 | 4/2002 | Singer et al. |
| 2003/0060272 | A1 | 3/2003 | Glavich et al. |

(Continued)

FOREIGN PATENT DOCUMENTS

| | | |
|---|---|---|
| JP | 2008-36401 A | 2/2008 |
| JP | 2009-207845 A | 9/2009 |

(Continued)

*Primary Examiner* — Paul A D'Agostino
(74) *Attorney, Agent, or Firm* — Howard & Howard Attorneys PLLC

(57) ABSTRACT

A gaming machine provides an operation unit, a display unit, and a control unit. The operation unit is an operation of the player. The display unit displays a display area with a plurality of cells arranged in a grid. The control unit allows a player to establish a wager, to establish one of a plurality of predefined subsets of the cells as a feature area as a function of the wager and to provide a game in response to player operation. The control unit randomly selects a plurality of symbols associated with the display area. Each symbol in the plurality of symbols is associated with one of the plurality of cells in the grid. The plurality of symbols forming an outcome of the game; detect an occurrence of a predetermined symbol in the feature area; and provide a game feature as a function of the occurrence of the predetermined symbol.

20 Claims, 18 Drawing Sheets

(56) References Cited

U.S. PATENT DOCUMENTS

| | | | |
|---|---|---|---|
| 2003/0216165 | A1 | 11/2003 | Singer et al. |
| 2006/0287036 | A1 | 12/2006 | Daly et al. |
| 2006/0287042 | A1 | 12/2006 | Osawa |
| 2007/0026933 | A1 | 2/2007 | Tanimura |
| 2007/0129135 | A1 | 6/2007 | Marks et al. |
| 2007/0287523 | A1 | 12/2007 | Esses et al. |
| 2009/0239643 | A1 | 9/2009 | Kato |
| 2009/0247262 | A1 | 10/2009 | Kato |
| 2009/0247272 | A1 | 10/2009 | Abe |
| 2009/0275385 | A1 | 11/2009 | Yadav |
| 2009/0305770 | A1 | 12/2009 | Bennett et al. |
| 2010/0069140 | A1 | 3/2010 | Yoshizawa |
| 2012/0115570 | A1 | 5/2012 | Collette et al. |
| 2013/0072282 | A1 | 3/2013 | Nicely |
| 2014/0256402 | A1 | 9/2014 | Caputo et al. |
| 2015/0235510 | A1 | 8/2015 | Meyer |
| 2016/0049038 | A1 | 2/2016 | Nakamura |
| 2016/0093153 | A1 | 3/2016 | Hawkins et al. |
| 2018/0075708 | A1 | 3/2018 | San |
| 2018/0286175 | A1 | 10/2018 | Kuhlmann et al. |

FOREIGN PATENT DOCUMENTS

| | | | |
|---|---|---|---|
| JP | 2016-10605 | A | 1/2016 |
| JP | 2016-34403 | A | 3/2016 |
| WO | 2014/133454 | A1 | 9/2014 |

FIG. 9B
ULTRA REELS
WIN
0
$0.00
BET
100
$2.00
CREDIT
119340
$1,193.40

FIG. 9C
ULTRA REELS
BONUS MULTIPLIERS
5X
WILD
15000
WIN
$150.00
40
BET
999999
CREDIT
$50
ULTRA REELS

GAMING MACHINE, CONTROL METHOD FOR MACHINE, AND PROGRAM FOR GAMING MACHINE

CROSS REFERENCE TO RELATED APPLICATION

This application is a continuation of U.S. patent application Ser. No. 16/676,181, filed Nov. 6, 2019, which is a continuation of U.S. Non-Provisional patent application Ser. No. 15/479,112, filed Apr. 4, 2017 (now U.S. Pat. No. 10,510,205, issued Dec. 17, 2019), the disclosures of which are hereby incorporated by reference in their entirety.

TECHNICAL FIELD

The present invention relates to a gaming machine, a control method for a gaming machine, and a program for a gaming machine.

BACKGROUND ART

A gaming machine represented by a slot machine is highly popular among casino customers as a device that provides gaming that is easy to enjoy, and recent statistics report that sales from gaming machines account for the majority of casino earnings. Initial slot machines were simple devices, wherein an inserted coin is received, a configured reel rotates and stops mechanically according to a handle operation, and a win or a loss is determined by a combination of symbols stopped on a single pay line. However, recent gaming machines, such as mechanical slot machines driven by a highly accurate physical reel via a computer controlled stepping motor, video slot machines that display a virtual reel on a display connected to a computer, and various gaming machines that apply similar technology to other casino games are quickly advancing. For the manufacturers that develop these gaming machines, an important theme is to provide an attractive game that strongly attracts casino customers as players, and improves the functionality of the gaming machine.

SUMMARY OF INVENTION

In one aspect of the present invention, a gaming machine is provided. The gaming machine includes an operation unit, a display unit, and a control unit. The operation unit is configured to receive an operation of a player. The display unit is configured to display a display area. The display area includes a plurality of cells arranged in a grid. The control unit is operably coupled to the operation unit and the display unit and is configured to allow a player to establish a wager, to establish one of a plurality of predefined subsets of the cells as a feature area as a function of player input and to provide a game in response to player operation. The control unit, in providing the game, is configured to randomly select a plurality of symbols associated with the display area, each symbol in the plurality of symbols being associated with one of the plurality of cells in the grid, the plurality of symbols forming an outcome of the game; detect an occurrence of a predetermined symbol in the feature area; responsively provide a game feature as a function of the occurrence of the predetermined symbol in the feature area; and provide an award to the player as a function of the outcome of the game and a pay table.

In another aspect of the present invention, a control method for providing a game to a player using a gaming machine is provided. The gaming machine includes an operation unit, a display unit, and a control unit. The operation unit is configured to receive an operation of a player. The display unit is operably configured to display a display area. The display area includes a plurality of cells arranged in a grid. The control unit is operably coupled to the operation unit and the display unit and provides a game in response to player operation. The control unit, in providing the game, performing the steps of allowing the player to make a wager; establishing one of a plurality of predefined subsets of the cells as a feature area as a function of player input; randomly selecting a plurality of symbols associated with the display area, each symbol in the plurality of symbols being associated with one of the plurality of cells in the grid, the plurality of symbols forming an outcome of the game; detecting an occurrence of a predetermined symbol in the feature area; responsively providing a game feature as a function of the occurrence of the predetermined symbol in the feature area; and providing an award to the player as a function of the outcome of the game and a pay table.

In still another aspect of the present invention, a program for a gaming machine provides a game to a player. The gaming machine includes an operation unit, a display unit, and a control unit. The operation unit is configured to receive an operation of a player. The display unit is configured to display a display area. The display area includes a plurality of cells arranged in a grid. The control unit is operably coupled to the operation unit and the display unit and is configured to provide a game in response to player operation. The program, in providing the game, performing the steps of allowing the player to make a wager; establishing one of a plurality of predefined subsets of the cells as a feature area as a function of player input; randomly selecting a plurality of symbols associated with the display area, each symbol in the plurality of symbols being associated with one of the plurality of cells in the grid, the plurality of symbols forming an outcome of the game; detecting an occurrence of a predetermined symbol in the feature area; responsively providing a game feature as a function of the occurrence of the predetermined symbol in the feature area; and providing an award to the player as a function of the outcome of the game and a pay table.

DETAILED DESCRIPTION OF EMBODIMENTS

A gaming machine, according to an embodiment of the present invention, referencing the attached figures is described in detail below. Further, duplicated descriptions will be omitted for identical attached symbols in identical or corresponding parts in each figure.

With reference to the drawings, and in operation, the present invention is directed towards a gaming machine, a control method for a gaming machine, and a program for a gaming machine that provides a game to a player. In one embodiment, the game includes a primary game and a feature or bonus game. As will be discussed in further detail below, during the primary and/or bonus game, one of a plurality of predefined subsets of the cells may be established as a feature area as a function of player input. During the primary and/or bonus game, if an occurrence of a predetermined symbol is detected in the feature area, a game feature may be provided.

Figure 1A:
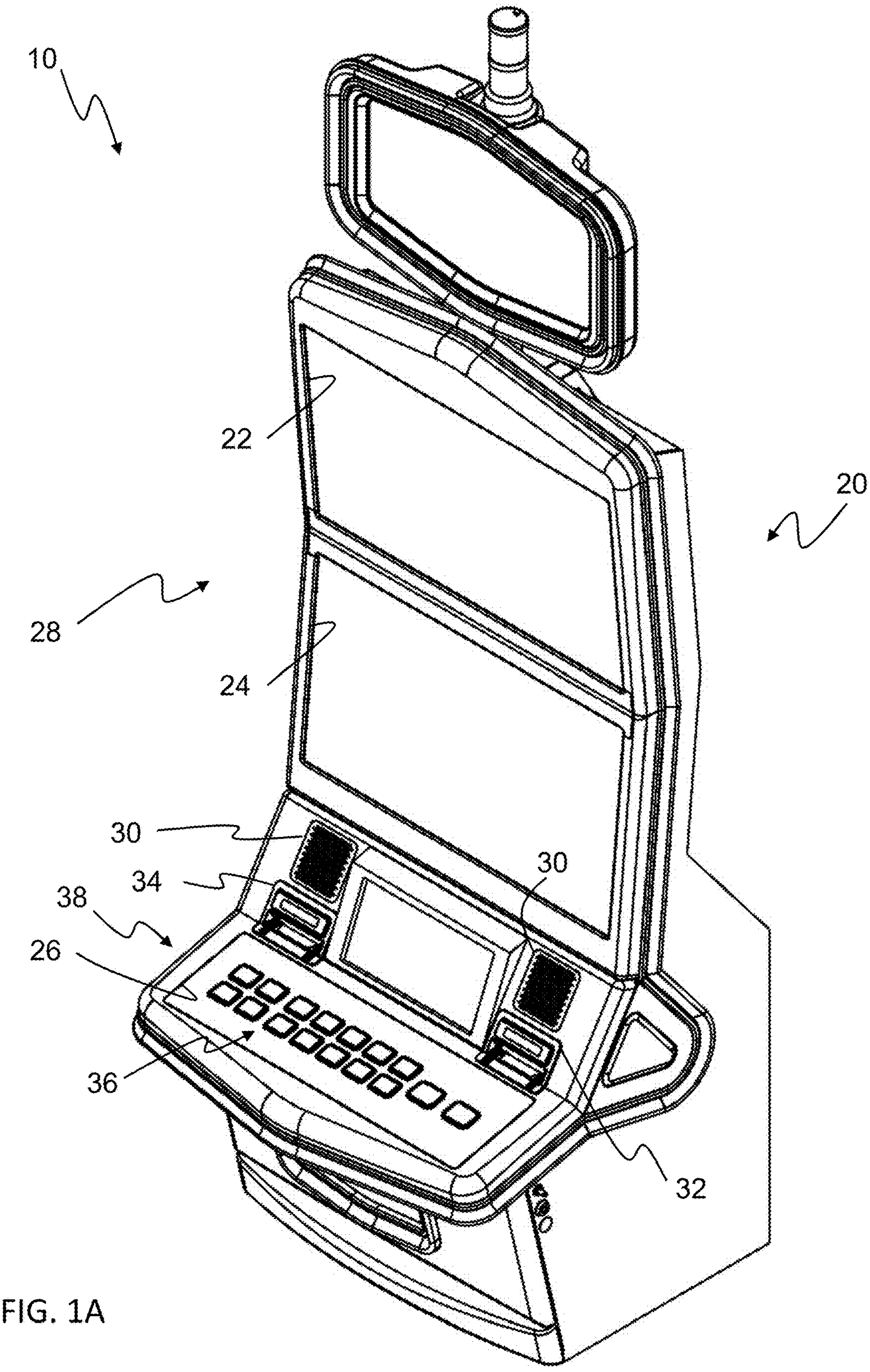
FIG. 1A is a perspective view of the gaming machine, according to the first embodiment.
Figure 1B:
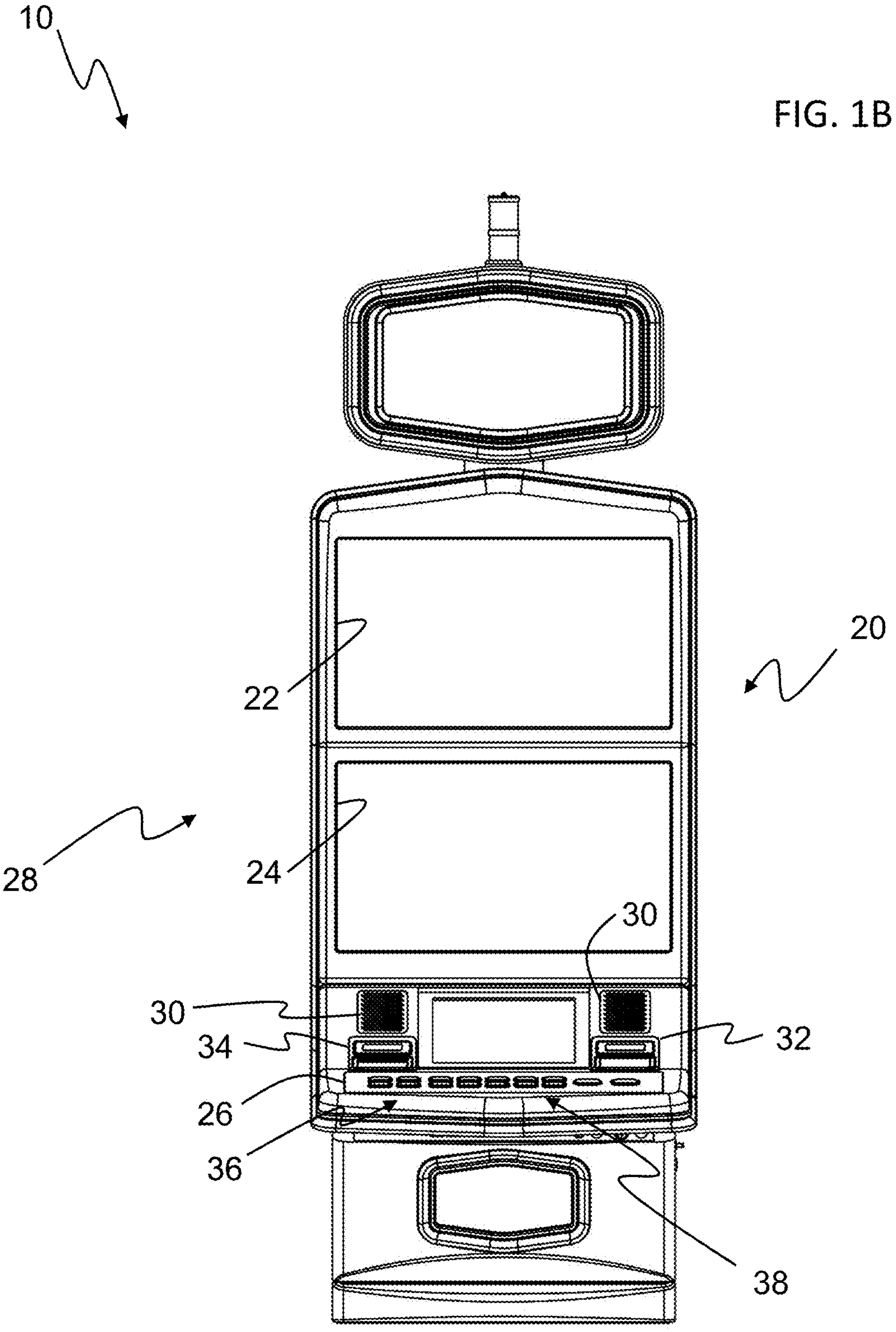
FIG. 1B is a front view of the gaming machine of FIG. 1A.

The gaming machine according to the present embodiment, receives a predetermined game value from the player, generates a game result, and provides a payout to the player according to the game result. FIG. 1A and FIG. 1B are a perspective view and a front view, respectively, of a gaming machine 10, according to the present embodiment. As shown in FIG. 1, this gaming machine 10 provides a cabinet 20 providing an upper display 22, a lower display 24, a control panel 26 and may also house a player tracking or ranking unit 57 (see FIG. 2). The cabinet 20 also houses a control unit 50 (see FIG. 2) that controls each part (see below). The control unit 50 also implements a random number generator (RNG) that is used during operation of the game. Each configuration is described below.

The upper display 22 and the lower display 24 may be flat panel display devices, such as both liquid crystal display devices and organic EL display devices and the like, and by controlling via each control unit 50, the display area mentioned below functions as a display unit 28 provided to the player.

Speakers 30 are provided on the left and right of the cabinet 20, and by controlling via the control unit 50, sound is provided to the player. On the control panel 26, a bill/ticket identification unit 32, the printer unit 34, and an operation unit 36 are provided.

The player tracking unit 57 may be housed on the center of the front surface of the cabinet 20 below the lower display 24. The player tracking unit 57 has a card reader that recognizes a player identification card, a display that presents data to the player, and a keypad that receives input by the player. This type of player tracking unit 57 reads information recorded on the player identification card inserted by the player into the card reader, and displays the information and/or information acquired by communicating with the external system on the display, by cooperatively operating with the control unit 50 mentioned below or an external system. Further, input from the player is received by the keypad, the display is changed according to the input, and communication with the external system is carried out as necessary.

The bill/ticket identification unit 32 is disposed on the control panel 26 in a state where the insertion opening that a bill/ticket is inserted into is exposed, an identification part that identifies a bill/ticket by various sensors on the inside of the insertion opening is provided, and a bill/ticket storage part is provided on the outgoing side of the identification part. The bill/ticket identification unit 32, receives and identifies bills/tickets (including vouchers and coupons) that are the game value as a game executing value, and notifies the control unit 50 mentioned below.

The printer unit 34 is disposed on the control panel 26 in a state where the ticket output opening that a ticket is output from is exposed, a printing part that prints predetermined information on a printing paper on the inside of the ticket output opening is provided, and a housing part that houses the printing paper inside the paper inlet side of the printing part is provided. The printer unit 34, under the control of the control unit 50 mentioned below, prints information on paper and outputs a ticket according to credit payout processing from the gaming machine 10. The output ticket can use the payout credit as game play by being inserted into the bill/ticket identification unit 32 of another gaming machine, or, can be exchanged for cash by a kiosk terminal inside of the casino or a casino cage.

The operation unit 36 receives the operation of the player. The operation unit 36 includes a group of buttons 38 that receives various instructions from the player on the gaming machine 10. The operation unit 36, for example, may include a spin button and a group of setting buttons. The spin button receives an instruction to start (start rotating the reel) the game listed below. The group of setting buttons 38 includes a group of bet buttons, a group of line-designation buttons, a max bet button, and a payout button and the like. The group of bet buttons receives an instruction operation regarding the bet amount of credits (bet number) from the player. The group of line-designation buttons receive an instruction operation that designate a pay line (referred to as an effective line below) subjected to a line judgment below from the player. The max bet button receives an instruction operation regarding the bet of the maximum amount of credits that can be bet at one time from the player. The payout button receives an instruction operation instructing a credit payout accumulated in the gaming machine 10.

Figure 2:
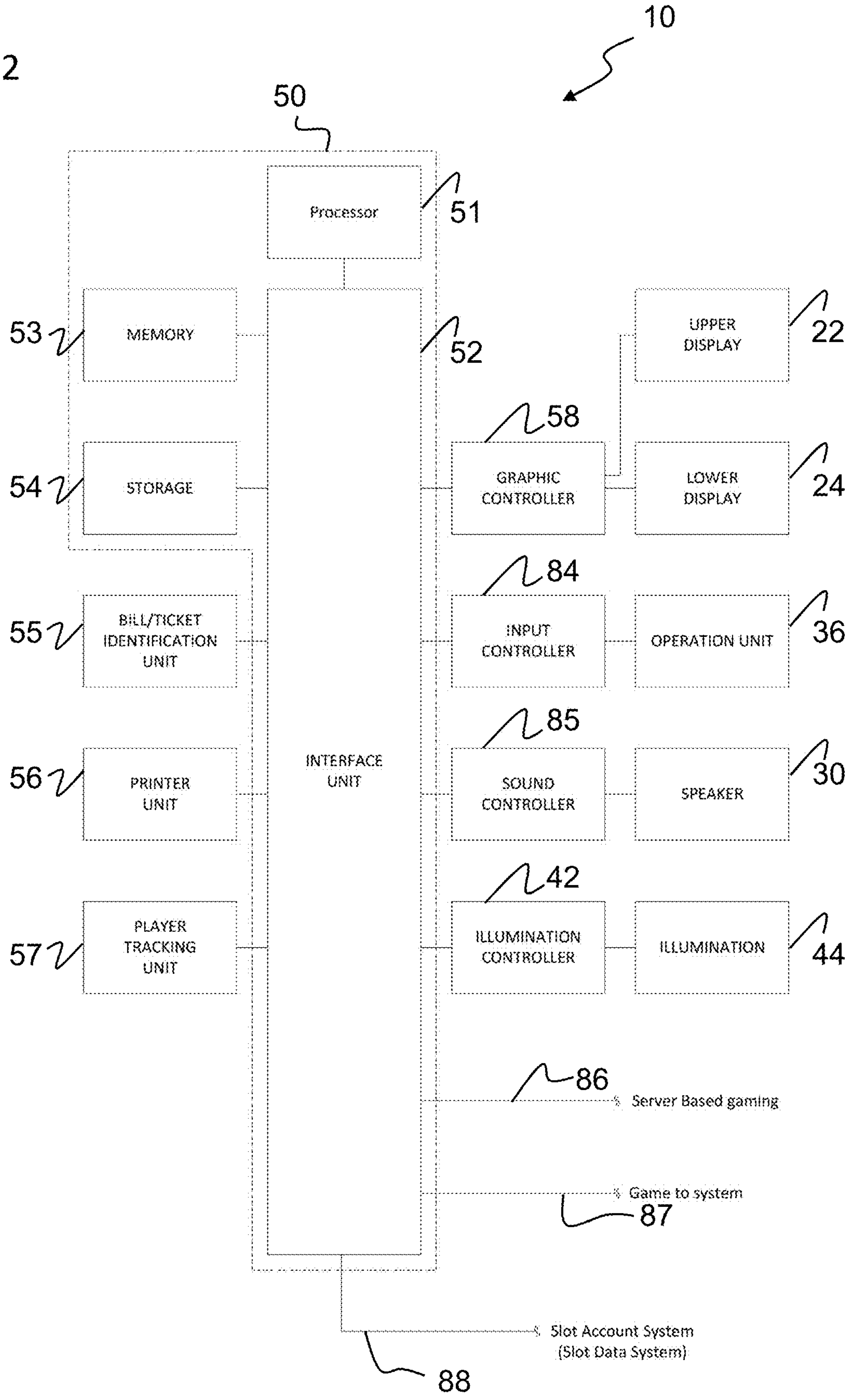
FIG. 2 is a functional block diagram of the gaming machine in FIG. 1.

With reference to FIG. 2, further on the inside of cabinet 20, a control board equipped with a central processing unit 51 (abbreviated as CPU below) that configures the control unit 50, an interface unit (or part) 52, a memory 53 and a storage 54 and the like are incorporated. The control board is configured so that communication is possible through the interface unit 52 and each of the components equipped on the cabinet 20, controls the operation of each part by executing the program recorded in the memory 53 or the storage 54 of the CPU 51, and provides a game to the player.

FIG. 2 shows a functional block diagram of the gaming machine 10, according to the present embodiment. The gaming machine 10 provides the control unit 50. The control unit 50 is configured as the interface unit 52 including a chip set providing communication functions of the CPU 51, a memory bus connected to a CPU 51, various expanding buses, serial interfaces, USB interfaces, Ethernet (registered trademark) interfaces and the like, and a computer unit where the CPU 51 provides the addressable memory 53 and the storage 54 through the interface unit 52. The memory 53 can be configured to include RAM that is a volatile storage medium, ROM that is a nonvolatile storage medium, and EEPROM that is a rewritable nonvolatile storage medium. The storage 54 provides the control unit 50 as an external storage device function, can use reading devices such as a memory card that is a removable storage medium, and a magneto optical disk and the like, and can use hard disks.

On the interface unit 52, in addition to the CPU 51, the memory 53, and the storage 54, a bill/ticket identification unit 55, a printer unit 56, the player tracking unit 57, a graphic controller 58, an input controller 84, and a sound controller 85 are connected. That is, the control unit 50 is connected to the operation unit 36 through the input controller 84, and connected to the upper display 22 and/or the lower display 24 through the graphic controller 58. Further, when illumination 44 that provides decorative lighting to the gaming machine 10 is provided, the illumination is controlled under the control of the control unit 50 on the interface unit 52, and an illumination controller 42 that provides a decorative lighting effect may be connected.

The control unit 50, which includes memory 53 and storage 54, controls each part by executing a program stored in the memory 53 and the storage 54, and provides a game to the player. Here, for example, the memory 53 and storage 54 may be configured to store a program and data of an operating system and subsystem that provide the basic functions of the control unit 50 to the EEPROM of the memory 53, and stores a program and data of an application that provides a game to the storage 54. According to such a configuration, it can be easy to change or update a game by replacing the storage 54. Further, the control unit 50 may be a multiprocessor configuration that has a plurality of CPUs.

Each block connected to the control unit 50 is described below. The bill/ticket identification unit 55 corresponds to the bill/ticket identification unit 32, receives bills/tickets in the insertion opening, and notifies the control unit 50 of identifying information corresponding to the assortment of bills or the payout processing of credits. The bill/ticket identification unit 55 notifies the information to the control unit 50, and the control unit 50 increases the usable credit amount inside of the game according to the notified content. The printer unit 56 corresponds to the printer unit 34, and under the control of the control unit 50 that receives an operation of the payout button of the group of setting buttons 38, information corresponding to the credit payout processing from the gaming machine 10 is printed and output on a printed ticket.

The player ranking (or tracking unit) unit 57 cooperatively operates with the control unit 50, and sends and receives information and the like of the player from the casino management system. The graphic controller 58 controls the upper display 22 and the lower display 24, under the control of the control unit 50, and displays a display image that includes various graphic data. The sound controller 85 drives the speakers 30 under the control of the control unit 50, and provides various sounds such as an announcement, sound effects, BGM and the like.

Further, the interface unit 52, has various communication interfaces for communicating with the exterior of the gaming machine 10, for example the interface unit 52 can communicate with an external network by Ethernet 86, 87, and a serial interface 88. In the present embodiment, one example shows when there is communication between a well-known server side gaming network (Server Based Gaming of FIG. 2), a G2S network (Game to System of FIG. 2), and a slot information system (Slot Data System of FIG. 2), respectively.

Figure 3:
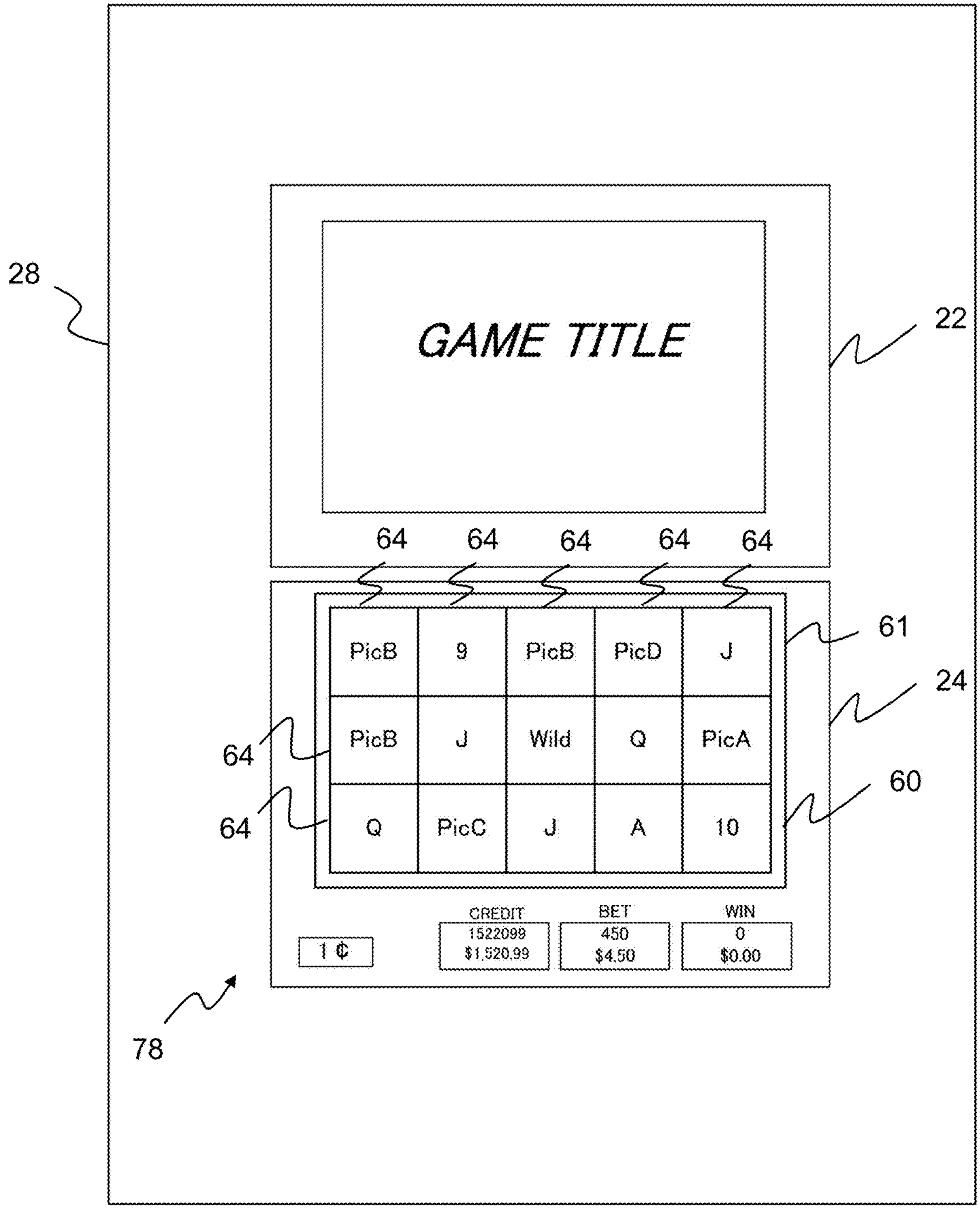
FIG. 3 is a first diagrammatic illustration of a display area of the gaming machine in FIG. 1, according to an embodiment of the present invention.

FIG. 3 schematically shows a display area 78 provided by the gaming machine 10. Such a display area 78 is displayed on the display unit 28 (the upper display 22 and/or the lower display 24) by the control unit 50 executing a predetermined program. In the illustrated embodiment, the display area 78 is displayed on the lower display 24. For instance, as shown, during the primary game and/or the bonus game, the upper display 22 may be utilized to display game related information, e.g., game title information and/or graphics.

In one aspect of the present invention, the gaming machine 10 provides a game to the player. The game may include a primary game and a game feature. The game feature may include one or more of (1) a multiplier applied to an award or payline, (2) a number of free games or spins, and/or (3) a bonus game. For instance, the primary game may be a video slot game, and the game feature may be the awarding of a number of free games or spins in response to the occurrence of a trigger condition, e.g., during the primary game. During the free spins, the game feature may also be provided.

Returning to FIG. 3, the game of the present invention utilizes a grid 60 in the display area 78 during the primary game and the free spins (if provided). The illustrated embodiment shows the state of displaying the display area 78 in the lower display 24. As shown in FIG. 3, the display area 78 includes the grid 60 for displaying symbols. By using such a display area, the gaming machine 10 of the present embodiment operates as a slot machine that pays a payout according to a winning combination of symbols displayed on the display area 78.

The display unit 28 displays a plurality of symbols in the grid 60. The grid 60 has a plurality of rows (r) and columns (c). The grid 60 is configured by a plurality of cells 64 that are the stop position of symbols.

With reference to FIG. 3, the grid 60 may be displayed on the lower display 24. The upper display 22 may be used to display animations and/or game identifying information during the primary game and/or during an attract mode. Further, the display unit 28 can display a decorative area, and an area that displays credit amount, bet number, and a credit amount obtained by winning (WIN number) and the like, outside of the grid 60. On each of the plurality of cells 64 of the display area 78, one symbol is stopped and displayed.

Figure 4:
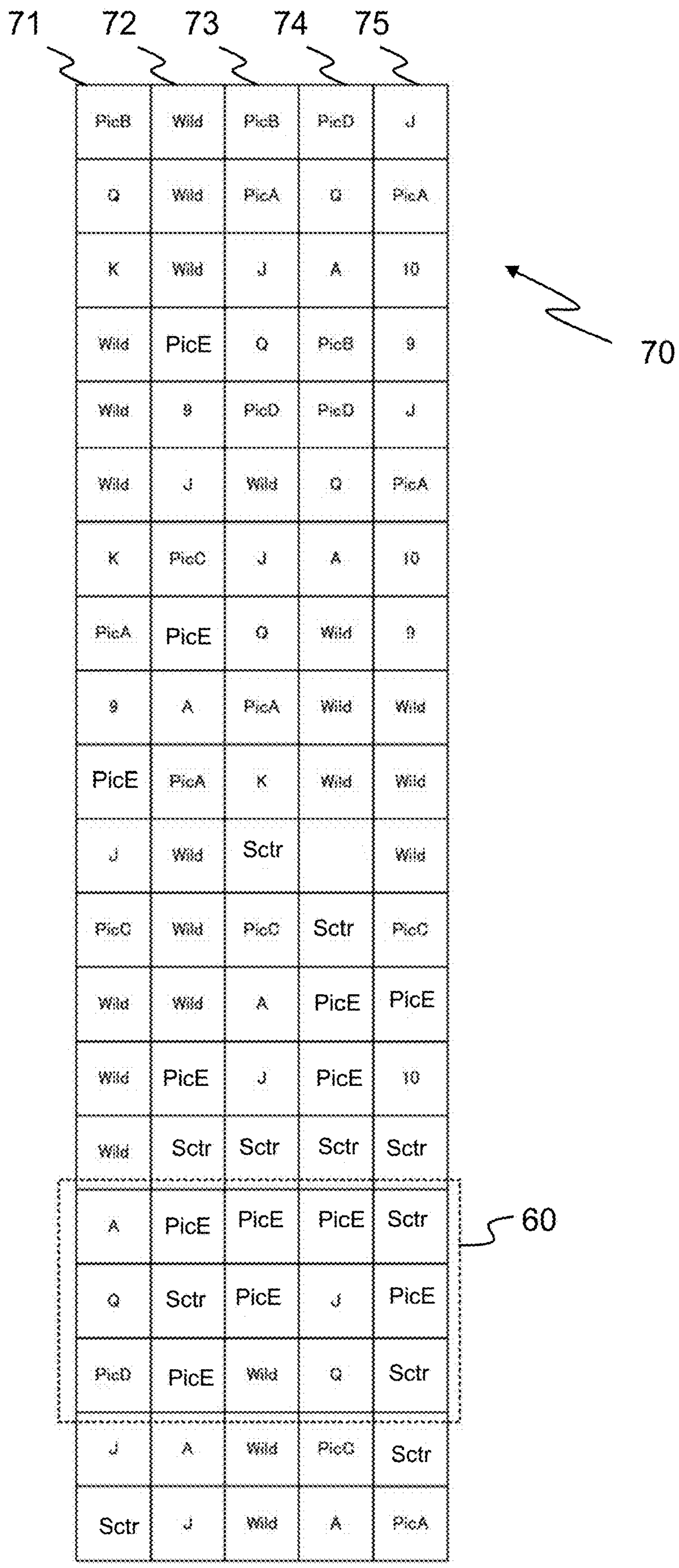
FIG. 4 is a figure showing an exemplary symbol arrangement showing the order of symbols displayed on the display area, according to an embodiment of the present invention.

On each cell 64 of the grid 60, as shown in FIGS. 3 and 4, a symbol is displayed based on the symbol arrangement of virtual reel strips 71 to 75 configured of a virtual reel set 70. That is, the cells 64 of the grid 60 correspond to the virtual reel strips 71 to 75 by column, and the symbols disposed on predetermined parts of each virtual reel strip 71 to 75 are displayed. Furthermore, by moving (scrolling or spinning) each symbol by column based on the symbol arrangement of the virtual reel strips 71 to 75, the symbols displayed in the cells 64 of the grid 60 change, and by stopping the movement (scrolling or spinning) by columns, the symbols are stopped. Here, the virtual reel strips 71 to 75 are data where the control unit 50 uses a program having the memory 53 or the storage 54, and data showing the symbol arrangement (i.e., the order of symbols on each reel) regulated by each cell column. Further, the virtual reel set 70 is a general term for such virtual reel strips 71 to 75.

Figure 5:
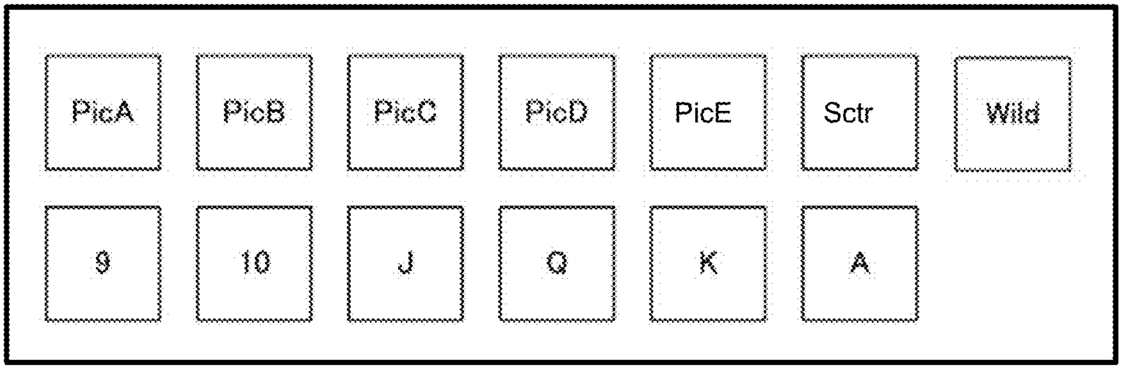
FIG. 5 is a figure showing the symbols displayed on the display area, according to an embodiment of the present invention.

Each virtual reel strip 71 to 75, in the examples of FIG. 4, is configured by 20 symbols in respective symbol positions, and those symbols are aligned in an order defined by each reel. FIG. 5 is the details of symbols of the figure shown in FIG. 4. Each virtual reel strip 71 to 75 includes symbols selected from a symbol set of 13 varieties shown in FIG. 5. This symbol set includes card symbols ("9", "10", "J", "Q", "K", and "A") that imitate playing cards as regular symbols, and picture symbols ("PicA", "PicB", "PicC", "PicD", and "PicE") that show a pattern. Further, this symbol set includes a wild symbol ("Wild") that is substituted as another symbol when a win combination is determined and a Scatter symbol ("Sctr") that is used to determine if a game feature is to be provided (see below). Each of these symbols have a different rank from each other regarding their value when winning, their rank gradually raises in this order: "9", "10", "J", "Q", "K", "A", "PicE", "PicD", "PicC", "PicB", "PicA". A combination of symbols that includes high-ranking symbols when winning, can obtain a larger winning payout compared to a combination of low-ranking symbols when winning.

It should be noted that in the illustrated embodiment, each column of the grid 60 has a corresponding reel strip. When the reel strip stops, a symbol from the respective reel strip appears in each one of the cells of the respective column of the grid 60. In an alternative embodiment, however, each cell 64 of the grid 60 has a respective independent reel that may spin independently of the other reels. Each cell 64 of the grid 60 may, thus, have an independent reel with a corresponding virtual reel strip 71 to 75.

In the next several embodiments, the present invention will be described with respect to a 3×5 grid, however, it should be noted that the present invention is not limited to a grid with any specific size and/or shape. Furthermore, the below discussion describes a game having a primary game and a bonus game. The bonus game provides a plurality of free games and/or spins.

In general, the control unit 50 starts a game (either the primary game or a free spin in the bonus game), determines the stop position of each virtual reel strip 71 to 75 randomly, the virtual reel strips 71 to 75 move from a current position, and the operation to stop on a stop position uses the display unit 28 (for example, the lower display 24) and is expressed. Due to this, in the display or grid 60, the symbols included on the virtual reel strips 71 to 75 are continuously moved (scrolled or spun) in the vertical direction of the display area 78, and one symbol of one cell 64 aligned in an order of the symbol based on the symbol arrangement is stopped so that it is displayed.

The control unit 50 changes and stops the plurality of symbols displayed on the display unit 28 according to the operation of the player received by the operation unit 36, and a payout may be paid according to the stopped symbols inside the display area 78.

In the display area 78, a pay line is set that is used when winning is determined. The pay line is set to be extended over the column on the right end from the cells of the column of the left end, and is a line that combines the plurality of cells 64 determining a win. The number of effective lines within the set pay line is selected by the operation of a group of line designation buttons included in the group of setting buttons 38 of the operation unit 36 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 78 is set (see FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than a predetermined number of the "Sctr" and/or "SpSctr" form a win combination or trigger condition regardless of the pay line.

Figure 6:
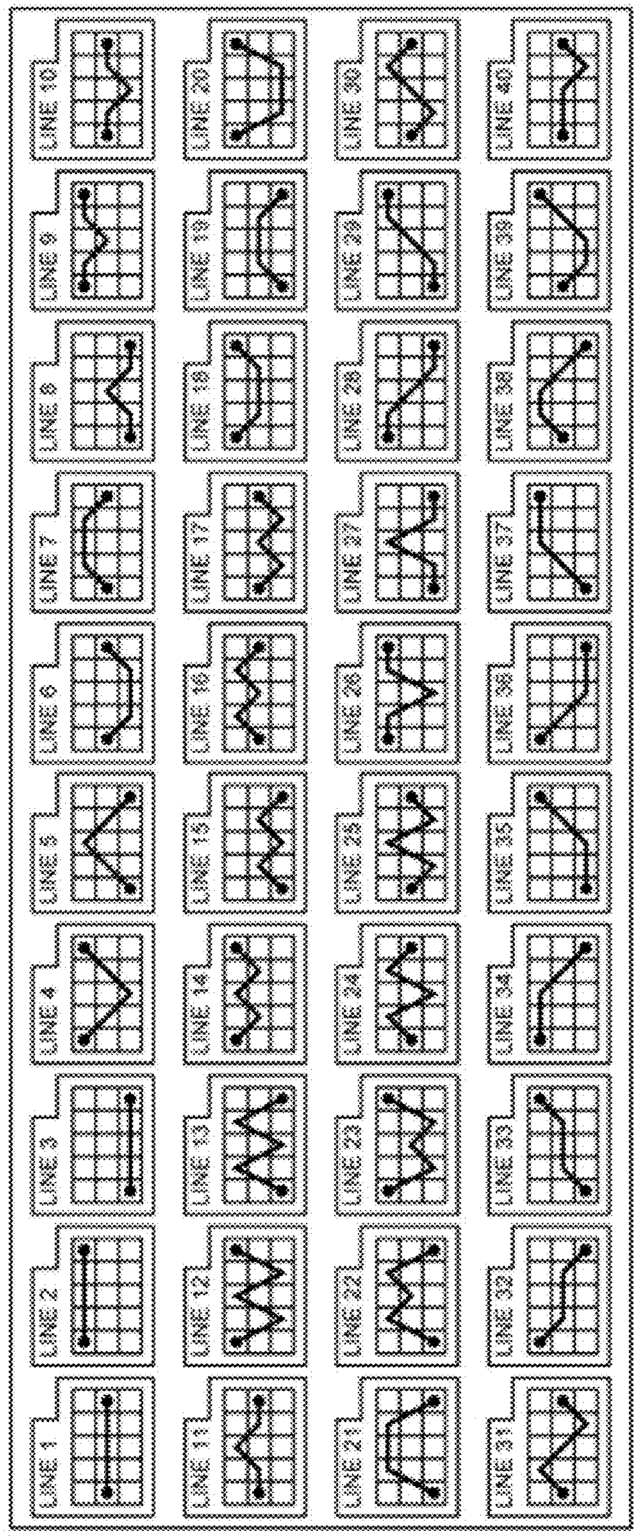
FIG. 6 is a figure showing one example of a pay line set on the determination area in FIG. 3.

It should be noted that pay lines shown other than (or in addition to) the pay lines shown in FIG. 6 may be used. In general, the pay lines shown in FIG. 6 start in the first column and end in the last column, and include one cell per column. However, one or more pay lines could include one or more cells in the same column and may include a vertical pay line.

The gaming machine 10 of the present embodiment provides a primary game (also referred to as a main game) and a game feature. The game feature may include one or more of (1) a multiplier applied to an award or payline, (2) a number of free games or spins, and/or (3) a bonus game. Generally, the game feature is provided when predetermined conditions, i.e., a triggering condition, are satisfied. Concerning a primary game (and any frees spins), the symbols displayed in the display area 78 configure a combination of symbols that are the result of a game, and determine a win.

In one embodiment of the present invention, the gaming machine 10 includes the operation unit 36, a display unit 22, 24 and a control unit 50. The operation unit 36 is configured to receive an operation of a player (see above). The display unit 22, 24 is operably coupled to the operation unit 36 and is configured to display a symbol display area 78. The symbol display area 78 includes a plurality of cells 64 arranged in a grid 60. As discussed above, the grid 60 has a plurality of rows and a plurality of columns.

The control unit 50 is operably coupled to the operation unit 36 and the display unit 22, 24 and is configured to initiate a game in response to player operation and to establish an outcome of the game. The control unit 50, in response to initiation of the game, being randomly selects a plurality of symbols associated with the symbol display area 78 or grid 60. Each symbol in the plurality of symbols is associated with one of the plurality of cells 64 in the grid 60. The plurality of symbols forms the outcome of the primary game.

In some embodiments, each symbol in the outcome of the primary game may be randomly selected. In the illustrated embodiment, the game is a video slot game. As discussed above, each column has an associated reel strip. In randomly selecting the symbols, the control unit 50 randomly determines a stop position (using a random number generator or RNG) for each reel strip and displays the outcome in a manner to simulate rotating reels. The symbol in each column in the outcome is a function of the associated reel strip and the randomly determined stop position.

As discussed in more depth below, the control unit 50 may establish the establishment of a feature area as a group of the cells 64. The feature area may be utilized in establishing whether a trigger condition has occurred (see below).

In the display area 78, a pay line is set that is used when winning is determined. The pay line is set to be extended over the column on the right end from the cells of the column of the left end, and is a line that combines the plurality of cells 64 determining a win. The number of effective lines within the set pay line is selected by the operation of a group of line designation buttons included in the group of setting buttons 38 of the operation unit 36 for the player. The control unit 50, in regards to the result of a game that is a combination of symbols, determines a win when a predetermined number of identical symbols is surpassed and aligned on a set pay line, and pays a payout to the player according to the type and number of symbols. On the gaming machine 10 of the present embodiment, a predetermined number of pay lines (LINE 1-40) of cells with three rows and five columns in the display area 78 is set (see FIG. 6). The system for determining a win may determine a win when a predetermined number of identical symbols from cells of the column on the left end are aligned on a set pay line, may determine a win when a predetermined number of identical symbols from cells of the column on the right end are aligned on a set pay line, and may determine a win when a predetermined number of identical symbols are aligned on a continuous column on a predetermined pay line. In addition, more than predetermined number of the "Sctr" and/or "SpSctr" form win combination or trigger condition regardless of the pay line.

The control unit 50 determines if a trigger condition has occurred during the primary game. If the trigger condition has occurred, then the game feature is provided.

Figure 7A:
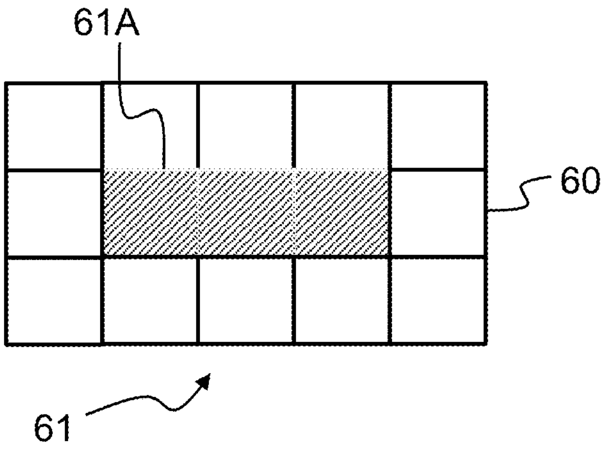
FIGS. 7A-7B are diagrammatic illustrations of the display area of the gaming machine in FIG. 1, according to an embodiment of the present invention.
Figure 7B:
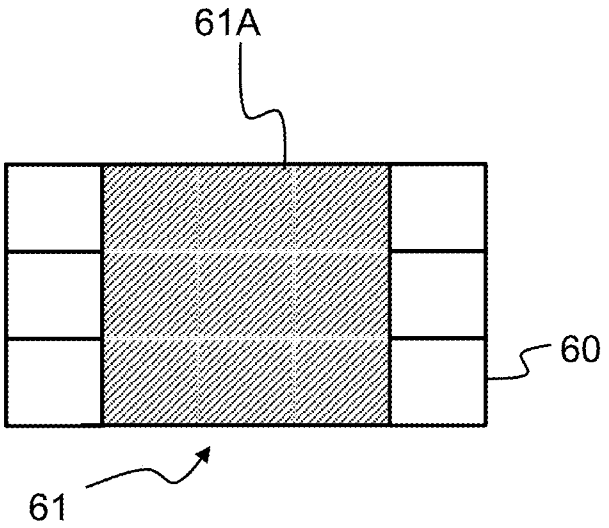

With reference to FIGS. 7A and 7B, in one aspect of the present invention, the trigger condition is defined as the appearance on a predetermined number of one of a predetermined one of the symbols in a feature area 61 of the grid. The feature area 61 is defined a predefined subset of the cells 64 of the grid 60. The subset may include less than or all of the cells 64 of the grid 60.

The control unit 50 establishes one of a plurality of predefined subsets of the cells 64 as the feature area 61. In one embodiment, the feature area 61 is established as a function of the wager made by the player. The control unit 50 provides a game in response to player operation. The control unit 50, in providing the game, randomly selects a plurality of symbols associated with the display area 78. Each symbol in the plurality of symbols being associated with one of the plurality of cells 64 in the grid 60. The plurality of symbols form an outcome of the game. An award may be awarded to the player as a function of the outcome of the game and a pay table.

In one embodiment, the control unit 50 is configured to detect an occurrence of a predetermined symbol, e.g., the Scatter symbol in the feature area 61 and to responsively provide a game feature as a function of the occurrence of the predetermined symbol in the feature area 61.

With reference to FIGS. 7A and 7B, each one of the predefined subsets 61 of the cells 64 includes an associated number of cells. In the illustrated embodiment, the subsets of cells 64 include a first subset of cells 61A and a second subset of cells 61B. The associated number of cells in the second subset of cells 61B is greater than the associated number of cells in the first subset of cells 61A. As shown, in the illustrated embodiment, the first subset of cells 61A includes three cells and the second subset of cells 61B includes nine cells. Each subset of cells 61 requires an associated minimum wager. The associated minimum wager of the second subset of cells 61B is greater than the associated minimum wager of the first subset of cells 61A.

As discussed above, in one embodiment the game is a video slot game. The grid 60 has a plurality of columns. Each column defines a reel of the video slot game. The control unit 50 is configured to select a plurality of symbols to display symbols in the cells of the grid 60 in a manner to simulate rotating reels. The plurality of symbols being displayed in the cells of the grid 60 when the simulated rotating reels are stopped.

In one embodiment, the game feature includes a multiplier applied to the award. The predetermined symbol may be a wild symbol. In one embodiment, each occurrence of the wild symbol in the feature area has an associated multiplier. The associated multiplier of each occurrence of the wild symbol are multiplied together and applied to the award.

In another aspect of the present invention, the game feature includes a number of free games (or spins). The predetermined symbol may be the scatter symbol. The game feature is triggered if a predetermined number of occurrences of the scatter symbol appear in the feature area 61. The number of free games may be predetermined, randomly determined and/or determined as a function of the number of occurrences of the scatter symbol in the feature area.

In still another aspect of the present invention, the game feature is a bonus game (see below).

Figure 8:
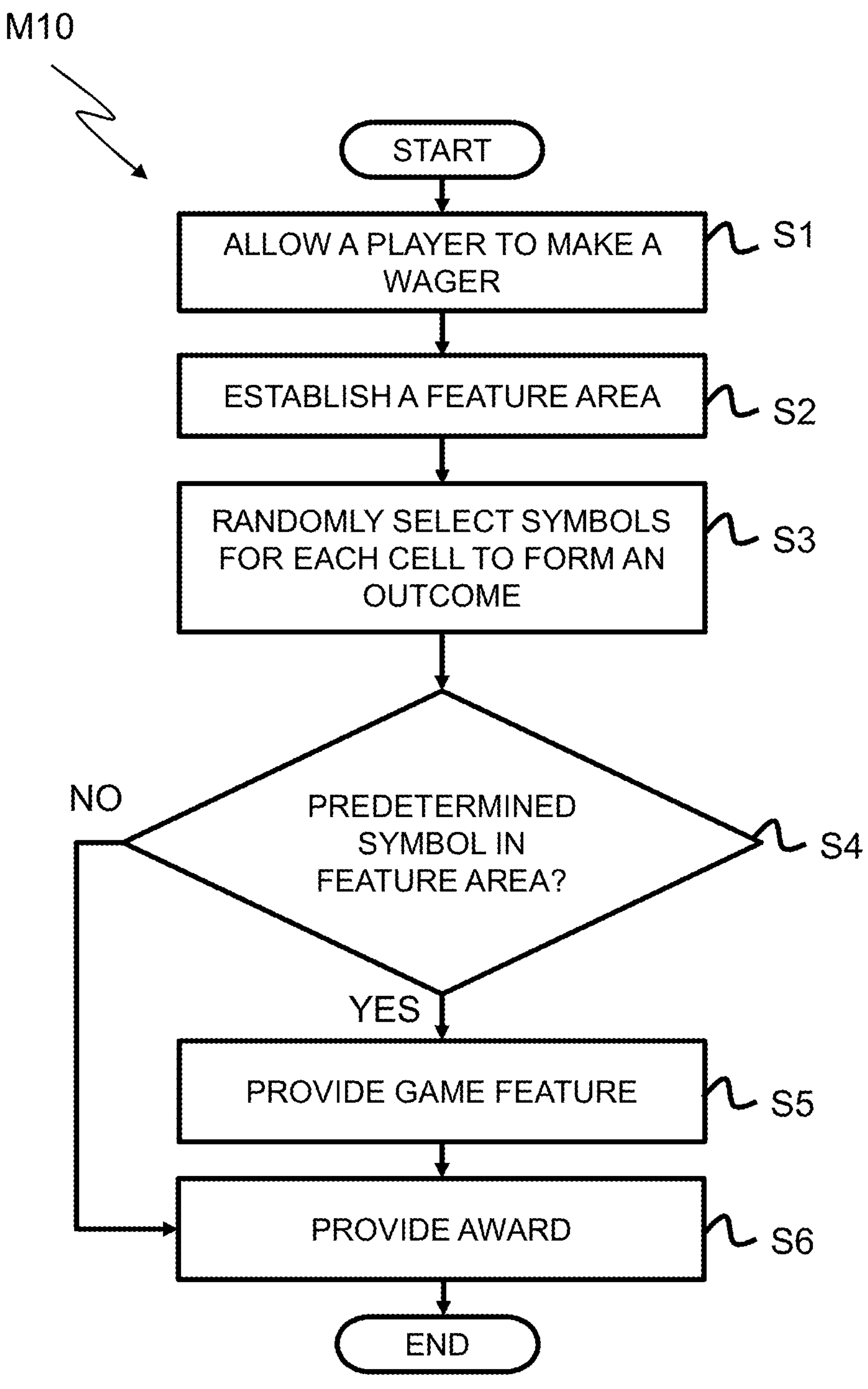
FIG. 8 is a flow chart describing the operation of the gaming machine during a game, according to one embodiment of the present invention.

With reference to FIG. 8, in another aspect of the present invention, a control method M10 providing a game to a player using a gaming machine 10. The gaming machine 10 including an operation unit 36, a display unit 28, and a control unit 50. The operation unit 36 is configured to receive an operation of a player. The display unit 28 is operably configured to display a display area 78. The display area 78 includes a plurality of cells 64 arranged in a grid 60. The control unit 50 is operably coupled to the operation unit 36 and the display unit 28 and provides a game in response to player operation.

In a first step S1, the player is allowed to make a wager. In a second step S2, one of a plurality of predefined subsets 61A, 61B of the cells 64 is established as a feature area 61 as a function of the wager. In a third step S3, a plurality of symbols associated with the display area 78 are randomly determined. Each symbol in the plurality of symbols is associated with one of the plurality of cells 64 in the grid 60. The plurality of symbols form an outcome of the game. In a fourth step S4, if an occurrence of a predetermined symbol in the feature area 61 is detected, then the method M10 proceeds to a fifth step S5. Otherwise, the method M10 proceeds to a sixth step S6. In the fifth step S5, the game feature is provided as a function of the occurrence of the predetermined symbol in the feature area 61. In the sixth step S6, an award is paid to the player as a function of the outcome of the game and a pay table.

In one embodiment the trigger condition is the appearance of a predetermined symbol or symbols in the feature area 61. The predetermined symbol may be randomly determined (the randomly determined symbol might be shown or not shown to the player). In one embodiment, one or more of the different types of game features may be provided during the same game. Different symbols may be used to trigger different ones of the game features. Or multiple game features may be triggered using the same trigger condition or triggering symbols.

In some embodiments of the present invention, the virtual reel strip 71 to 75 stop in a predetermined order, for example, from left to right.

In some embodiments of the present invention, the grid 60 is rectangular with the same number of rows across all columns and the same number of columns across all rows. The number of rows may be odd or even. The number of columns may be odd or even. For example, in one embodiment, the grid 60 may include fifteen cells 64 disposed in a grid shape of three rows and five columns.

In another embodiment, the number of rows per column may not be the same and/or the number of columns per row may not be the same. With reference to FIGS. 9A-14B, in a second illustrated embodiment is shown. In the second illustrated embodiment, the grid 60 includes five columns. However, each of the first and fifth columns include three rows, while the second through fourth columns include four rows. Such as grid may be referred to as a 3-4-4-4-3 grid.

Figure 9A:
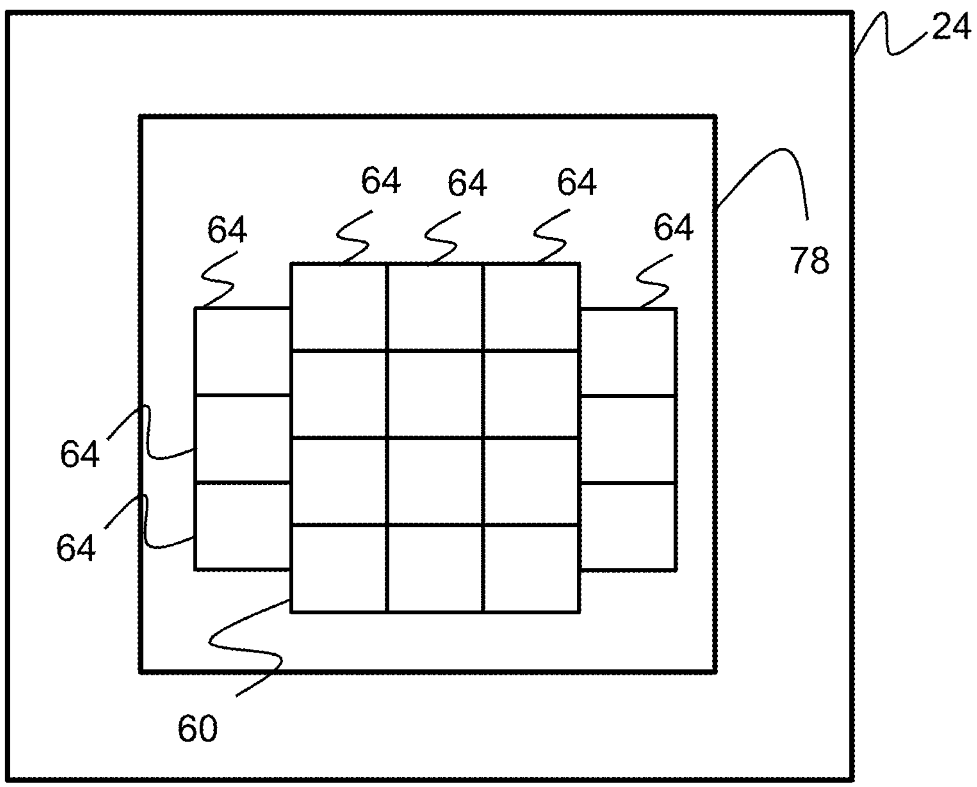
FIGS. 9A-9C are first, second, and third diagrammatic illustrations of a display area of the gaming machine in FIG. 1, according to another embodiment of the present invention.
Figure 9B:
Figure 9C:
Figure 10A:
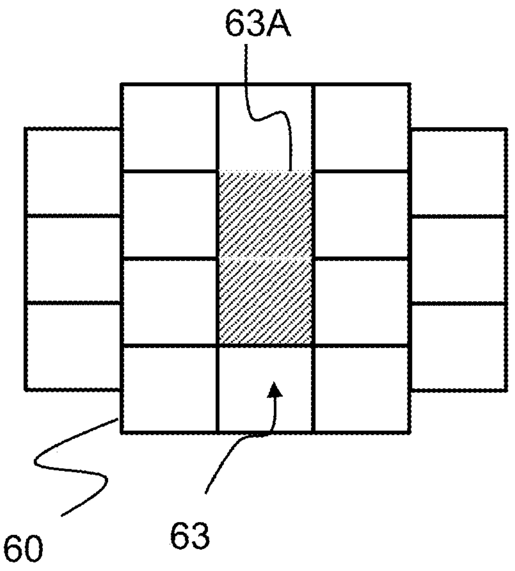
FIGS. 10A-10E are first, second, third, fourth, and fifth diagrammatic illustrations of a display area of the gaming machine in FIG. 1, according to the another embodiment of the present invention.
Figure 10B:
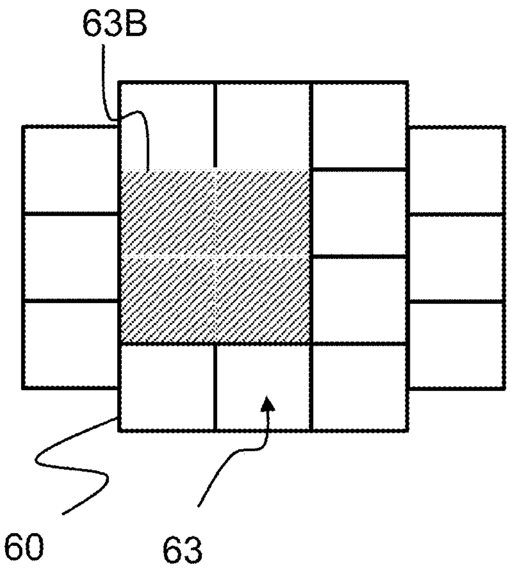
Figure 10C:
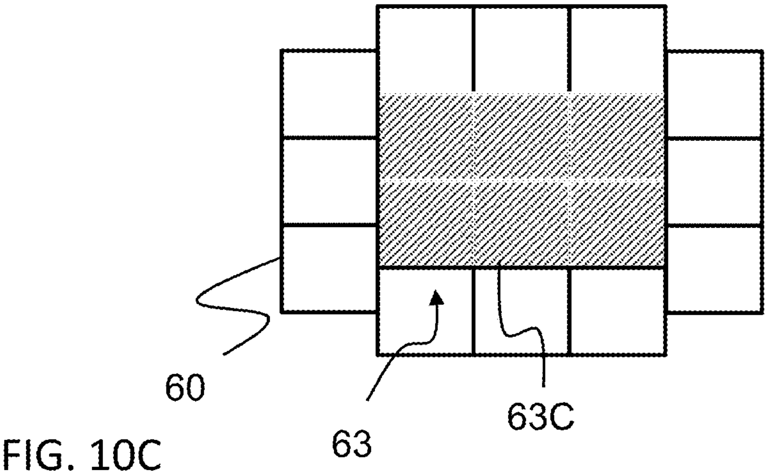
Figure 10D:
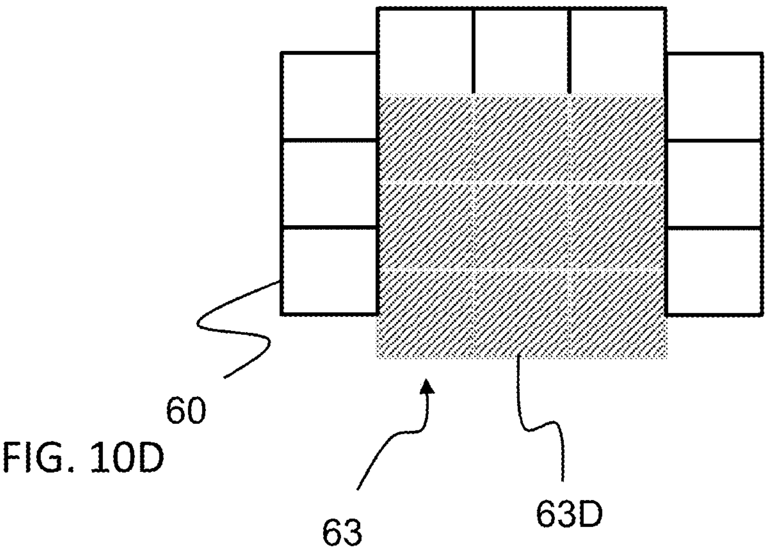
Figure 10E:
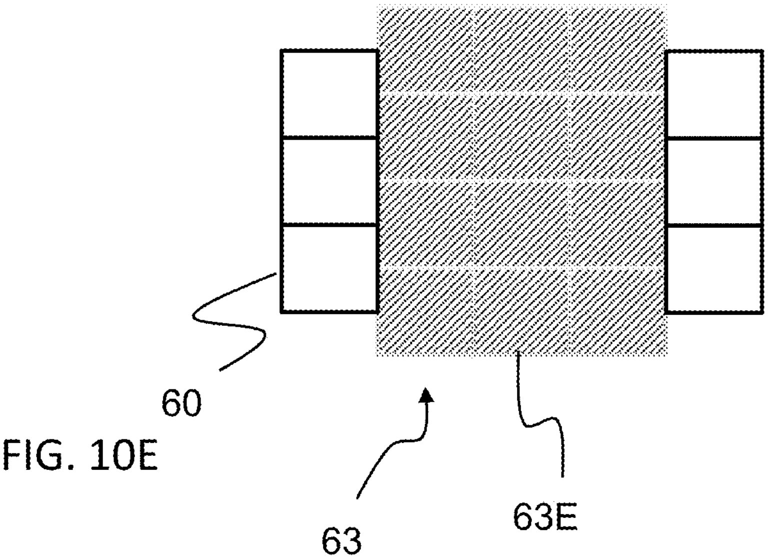
Figure 11:
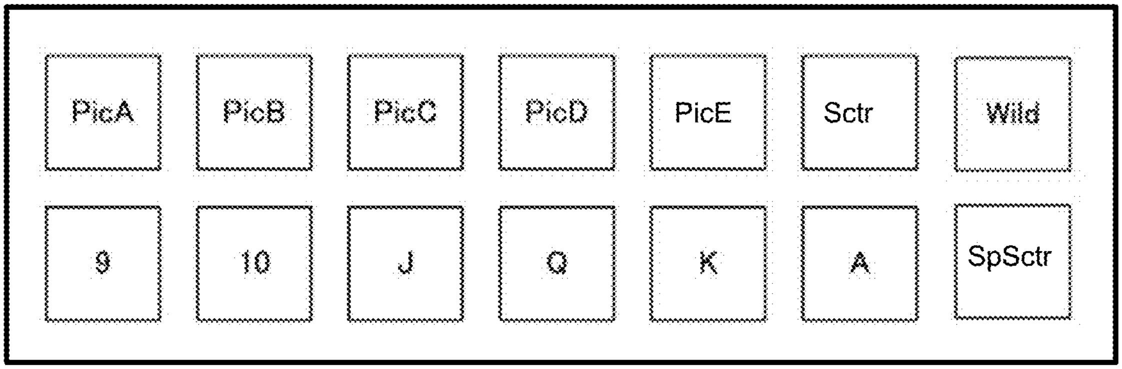
FIG. 11 is a figure showing the symbols displayed on the display area, according to a second embodiment of the present invention.
Figure 12A:
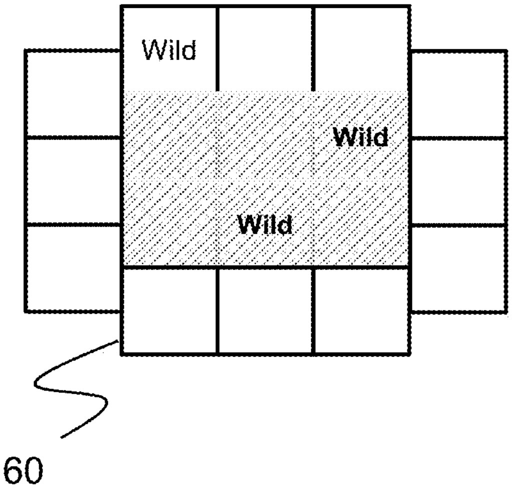
FIGS. 12A-12B are first and second diagrammatic illustrations of a display area of the gaming machine in FIG. 1, according to the second embodiment of the present invention.
Figure 12B:
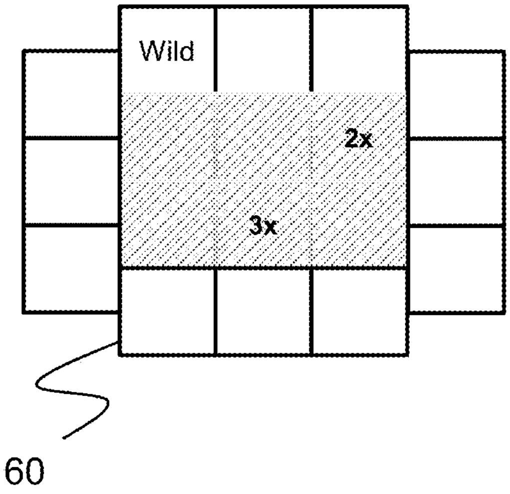

In the illustrated embodiment, the grid 60 is utilized for the primary game and may be utilized for the game feature. In the next several embodiments, the present invention will be described with respect to a 3-4-4-4-3 grid, however, it should be noted that the present invention is not limited to a grid with any specific size and/or shape. Furthermore, the below discussion describes a game having a primary game and a game feature. The game feature may provide a plurality of free games and/or spins. The free games and/or spins may utilize the 3-4-4-4-3 grid. A first exemplary screenshot of the grid 60 is shown in FIG. 9B and a second exemplary screenshot of the grid is shown in FIG. 9C.

The second illustrated embodiment provides a game. The game contains a free game and wheel game feature (the wheel feature being nested inside the free game trigger). The bonus game is triggered by 3, 4 or 5 trigger symbols, where when triggered, players receive 7, 12 or 20 free games, respectively. If any trigger symbols land in the feature area on the primary game screen, players also receive up 1, 2 or 3 spins of a bonus prize wheel prior to initiating the free game feature.

The symbols are "9", "10", "J", "Q", "K", "A", "PIC-d", "PIC-c", "PIC-b", "PIC-a", "Wild", "Sctr" and "SpSctr". The Wild symbol substitutes for all symbols except for Sctr or SprSctr. The wild symbols only appear on reels 2, 3 and 4. All of the other remaining symbols have the possibility to appear on every reel. All wins pay from the left most reel to the right in any positions on adjacent reels. In one embodiment, the "SpSctr" only appears in place of "Sctr" when the "Sctr" is to appear in the feature area of the game outcome.

During the free games, the second, third, and fourth reels each contain a number of positions that are randomly replaced with one of the following symbols: 9", "10", "J", "Q", "K", "A", "PIC-d", "PIC-c", "PIC-b", "PIC-a", "Wild" and "Sctr".

With reference to FIGS. 10A-10E, in the second illustrated embodiment, the set of possible feature areas includes first, second, third, fourth and fifth feature areas 63A, 63B, 63C, 63D, 63E. As shown, the first, second, third, fourth and fifth feature areas 63A, 63B, 63C, 63D, 63E includes two, four, six, nine, and twelve cells, respectively. In the illustrated embodiment, the player may select, via the operation unit 36, one of the feature areas 63A, 63B, 63C, 63D, 63E. Each feature area first, second, third, fourth and fifth feature areas 63A, 63B, 63C, 63D, 63E requires a minimum bet or wager. The player is allowed to bet the minimum or a multiple of the minimum bet (up to 5× the minimal bet). In one embodiment, the selected/established feature area is used in the primary game and any resulting free games or spins.

For example, in the second illustrated embodiment, the following bets or wagers (in credits) are allowed:

| Feature Area | Minimum Bet (Min. Bet × 1) | Max Bet (Min. Bet × 5) |
|---|---|---|
| First | 50 | 250 |
| Second | 75 | 375 |
| Third | 100 | 500 |
| Fourth | 150 | 750 |
| Fifth | 200 | 1,000 |

It should be noted that in the illustrated embodiments, the player can also bet: (1) 2× minimum bet, (2) 3× minimum bet, and (3) 4× minimum bet. Once the player has selected his wager, the control unit 50 establishes the associated feature area as the feature area to be used in the game.

As discussed in more detail below, the second illustrated embodiment includes several game features. The game in the second illustrated embodiment utilizes the established (or selected) feature area to provide features that are affected by any wild or scatter symbol that appear therein. With reference to FIG. 10, in the second illustrated embodiment, the symbol set includes a scatter symbol ("Sctr") and a special scatter symbol (SpSctr). The full set of symbols that may be used includes: "9", "10", "J", "Q", "K", "A", "PIC-d", "PIC-c", "PIC-b", "PIC-a", "Wild", "Sctr" and "SpSctr".

The game features involving the established feature area in the second illustrated embodiment include: (1) a wild enhancement multiplier feature, (2) a free game feature, and (3) a wheel feature. In the second illustrated embodiment, the wheel feature may only be triggered when the free game feature is triggered. However, the present invention is not limited to such an embodiment. The game features involving the established feature area will be discuss in more detail below.

The wild enhancement multiplier feature may be provided during the primary game and/or any free spins. In the outcome of a primary game or a free spin, when one or more wild symbols appear in the established feature area, a multiplier appears on each wild symbol appearing in the feature area 61. For example, with reference to FIG. 12A, a wild symbol appears outside of the feature area and two wild symbols appear in the feature area 61. The two wild symbols appearing within the feature area 61 are respectively replaced with wild symbols having either multipliers of 2× or multiplier of 3×, randomly. The multipliers are multiplicative. Thus, in the example of FIG. 12B, a multiplier of 6× is used on a win combination including both of the multipliers.

The free game feature is triggered (during a primary game or a free spin) if three, four, or five scatter symbols or special scatter symbol appears in the outcome. In one embodiment, the triggering scatter symbols may appear anywhere in the outcome, i.e., in or out of the feature area. In another embodiment, the triggering scatter symbols must appear within the feature area. In the second illustrated embodiment, seven, twelve, and twenty free games are awarded in response to three, four, and five scatter or special scatter symbols appearing in the outcome, respectively. However, it should be note that the present invention is not limited to a specific number of free games being awarded.

During the free games or spins, the second, third and fourth reel strips each contain a number of positions that are randomly replaced with one of the following symbols: "9", "10", "J", "Q", "K", "A", "PIC-d", "PIC-c", "PIC-b", "PIC-a", "Wild" and "Sctr". The replacement may occur before the spin is initiated and all replacement positions are filled with the same random symbol.

In the second illustrated embodiment, the wheel feature is triggered, only if free game feature has been triggered, and if at least one special scatter ("SpcSctr") symbol appears. In one embodiment, the SpcSctr symbol(s) must appear in the feature area. In another embodiment, the SpcSctr symbol(s) may appear anywhere in the outcome of the primary game or free game.

As discussed in more detail below, the wheel feature includes a spin of a wheel (see below) for each SpcSctr symbol. The wheel includes a number of awards that may be awarded to the player. In one aspect of the second illustrated embodiment, the player may initiate the spinning of the wheel through actuation of a spin button. Otherwise, after a predetermined period of time, the wheel will start spinning.

In one embodiment, the wheel feature is activated before the free spins. The possible awards on the wheel may include:

- credit prizes;
- additional free games, e.g., three, five, eight or fifteen games;
- a 3× or 5× wild multiplier upgrade applied to all wilds appearing in the feature area during free games;
- if the wild multiplier upgrade is awarded, then the 3× or 5× wild upgrade wedges on the wheel may change to a different award in later wheel feature which was triggered at the same time, for example, an additional free games award or additional credit award.

Figure 13:
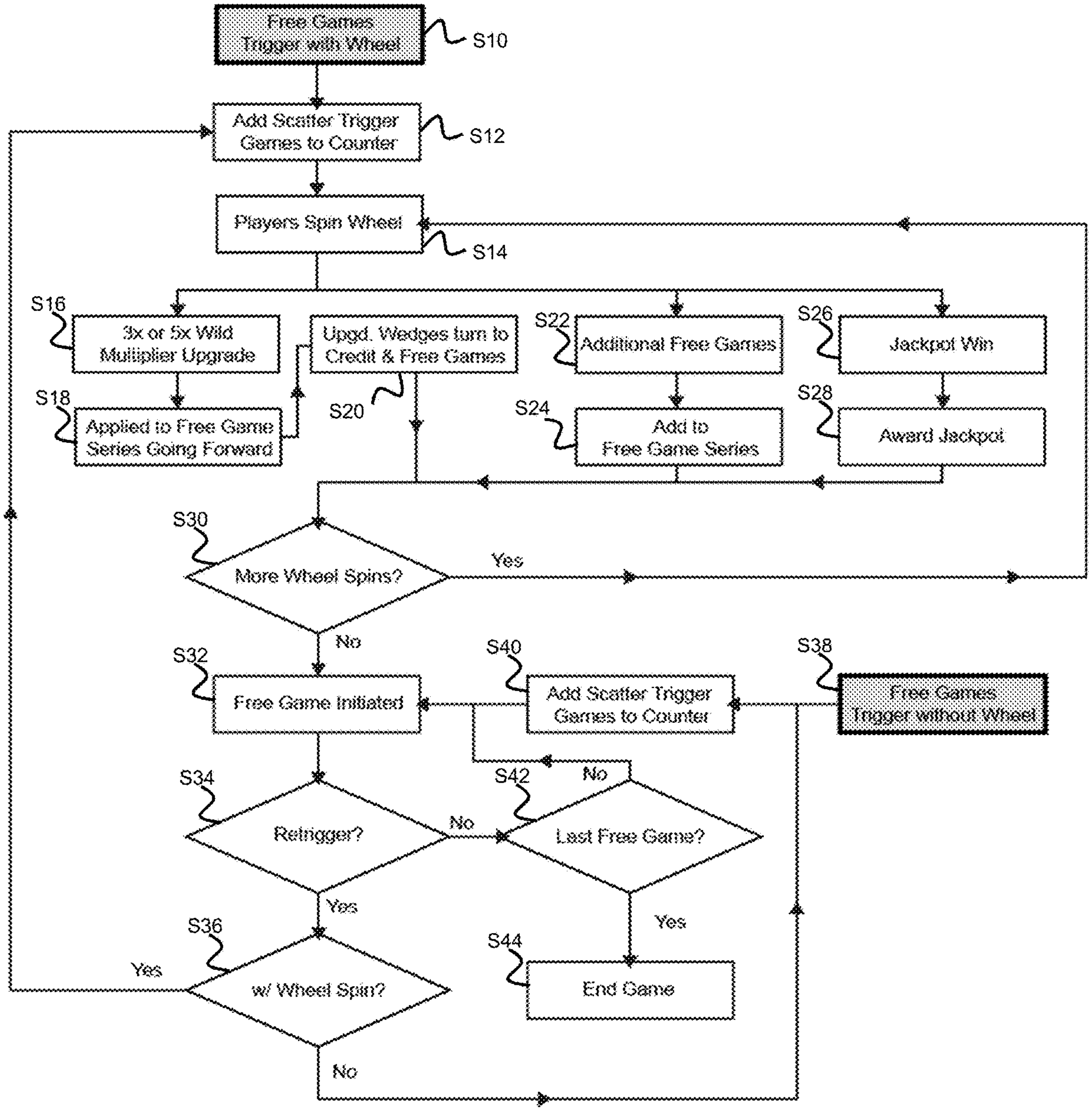
FIG. 13 is a flow chart describing the operation of the gaming machine during a game, according to the second embodiment of the present invention.
Figure 14A:
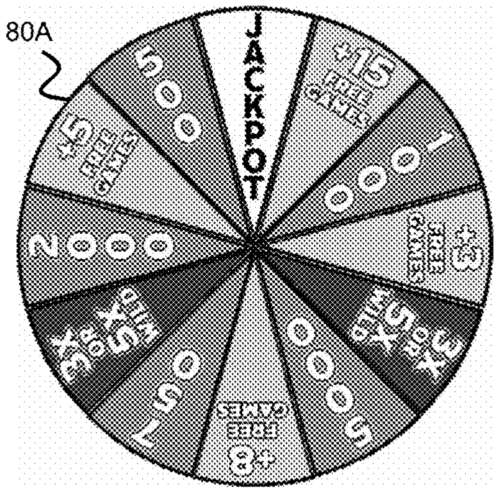
FIGS. 14A and 14B are diagrammatic illustrations of a wheel utilized in a wheel feature of the second embodiment.
Figure 14B:
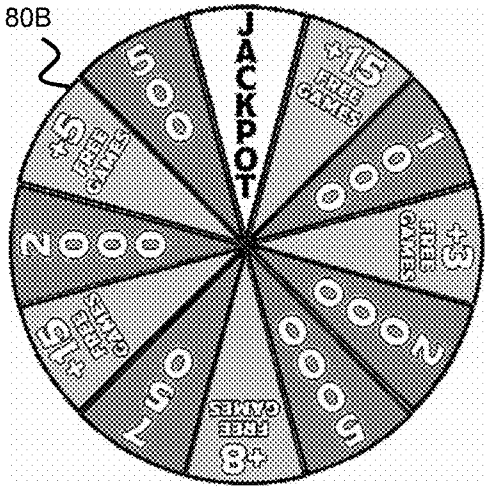

With reference to FIG. 13, a method M20 related to the free games feature and the wheel feature is shown. In a first step S10, during the primary game, a plurality of free games and at least one spin of the wheel are awarded to the player (during the main game). Exemplary wheels are shown in FIGS. 14A and 14B. The wheel feature may be displayed in the upper display 22 and/or the lower display 24. During each spin of the wheel, the wheel rotates and one of the slices or wedges on the wheel is randomly determined. The wheel is stopped such that the randomly determined wedges is located under or adjacent a pointer (not shown). In a second step S12, the number of free games awarded to the player are added to a free game counter.

In a third step S14, the player initiate the spinning of the wheel. As noted above, if the player does not initiate the spinning of the wheel in a predetermined period of time, then the wheel begins to spin automatically.

With reference to FIG. 14A, at the beginning of the wheel feature, an initial wheel 80A is used. The initial wheel 80A has twelve wedges. Five of the wedges have an associated credit amount (500, 1000, 5000, 750, and 2000 credits, respectively). Four of the wedges have a number of additional free games (15, 3, 8, and 5 free games). Two of the wedges have an associated wild multiplier. In the illustrated embodiment, the associated multiplier is 3× or 5×. The last wedge is a jackpot wedge. The jackpot wedge has an associated, fixed number of credits, e.g., 100,000.

After wheel begins to spin and stops to indicate the randomly determined wedge.

If one of the wild multiplier upgrade wedges is selected, then the method proceeds to a fourth step S16. In a fifth step S18, 3× or 5× multiplier is applied to the wild feature in the following free games (see above). In a sixth step S20, the wild upgrade wedges are modified into one of an additional free game wedge, e.g., +15 free games) and an additional credit wedge, e.g., 2,000. This creates a modified wheel, as secondary wheel 80B, as shown in FIG. 14B. The secondary wheel 80B is used for any subsequent wheel spins.

Returning to the third step S14, after the wheel stops spinning, if one of the additional free games wedges has been selected in a seventh step S22, the method M20 proceeds to an eighth step S24. In the eighth step, the additional free games, e.g., +3, +8, +5, or +15, are added to the previous total of free games.

Returning to the third step S14, after the wheel stops spinning, if the jackpot win wedge has been selected in a ninth step S26, then the jackpot is awarded to the player in a tenth step S28. After the sixth, eighth or tenth steps S20, S24, S28, the method M20 proceeds to an eleventh step S30. In the eleventh step S30, the wheel spin counter is decremented. If there are additional wheel spins, then the method M20 returns to the third step S14. Otherwise, the method M20 proceeds to a twelfth step S32. In the twelfth step S32, a free game is initiated (and played). Any award as a result of the free game is paid to the player.

In a thirteenth step S34, if the free games feature is retriggered in the outcome of the free game, then the method M20 proceeds to a fourteenth step S36. In the fourteenth step S36, if the wheel spin feature was triggering in the outcome of the previous free game, then the method M20 returns to the second step S12.

Returning to the thirteenth step S34, if the free game feature was not retriggered then the method M20 proceeds to a fifteenth step S42. In the fifteenth step S42, the free game counter is decremented and if there are no remaining free games, then the method ends (sixteenth step S44). Otherwise, the method M20 returns to the twelfth step S32.

Returning to the fourteenth step S36, if the wheel spin feature was not retriggered, then the method M20 proceeds to a sixteenth step S40. In the sixteenth step S42, the additional free games are added to the free game counter and the method returned to the twelfth step S32.

In the primary game, if the free game feature is triggered, but the wheel feature is not triggered, then the method M20 is entered at a seventeenth step S38. Then the proceeds to step S40.

Next, is a description of a program of the gaming machine 10 for operating one or a plurality of computers as the control unit 50. The gaming machine 10 stores the program in the memory, and can execute the program. The gaming machine 10 can access the program stored in the memory and can operate as the gaming machine 10 of the present embodiment by the program.

Further, the program according to the embodiment may be provided through a network or stored in a recording medium. Recording media such as a floppy (registered trademark) disk, CD-ROM, DVD, or ROM and the like, or semiconductor memory and the like are exemplified as a recording medium. In this case, a program stored in the memory uses a reading device inside the gaming machine 10 such as a floppy (registered trademark) disk drive device, CD-ROM drive device, and DVD drive device and the like.

The embodiments of the present invention are described above, but the present invention is not limited to such an embodiment, a variety of variations are possible.

In such an embodiment, a gaming machine 10 providing a game in the form of a slot machine is described, but this is not limited thereto, and a game in the state of poker, a video card game called black jack, bingo, keno, a wheel game and the like may be provided. Further, it is possible to apply the present invention to a pachinko machine or a pachinko slot machine.

In one embodiment, referring to FIGS. 1A and 1B, the control panel 26 includes a plurality of user input devices that may include an acceptor device which accepts media associated with a monetary value to establish a credit balance, a validator configured to identify the physical media, a cash-out button actuatable to cause an initiation of a payout associated with the credit balance. The acceptor device may include a touchscreen display associated with the display unit 28 and/or the player tracking unit 57, the paper money/ticket identification unit 42, the operation unit 36, the player tracking unit 57, a coin slot, a ticket in ticket out (TITO) system, a bill acceptor, and/or any suitable device that enables the gaming machine 10 to receive media associated with a monetary value and establish a credit balance for use in playing the gaming machine 10. In one embodiment, the acceptor device may be configured to receive physical media such as, for example, a coin, a medal, a ticket, a card, a boll, currency, and/or any suitable physical media that enables the gaming machine 10 to function as described herein. The acceptor device may also be configured to accept virtual media such as, for example, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. The control unit 50 converts a value of the coins and/or tokens to a corresponding amount of gaming credits that are used by the player to wager on games played on the gaming machine 10. The bill acceptor may include an input and output device that is configured to accept a bill, a ticket, and/or a cash card into the bill acceptor to enable an amount of gaming credits associated with a monetary value of the bills, ticket, and/or cash card to be credited to the gaming machine 10. In one embodiment, the bill acceptor also includes a printer (not shown) that is configured to dispense a printed voucher ticket that includes information indicative of an amount of credits and/or money paid out to the player by the gaming machine 10 during a gaming session. The voucher ticket may be used at other gaming devices, or redeemed for cash, and/or other items as part of a casino cashless system.

In the embodiment, determining the stop position of each reel is described as consecutively acquiring a random number that is used respectively, but the acquisition procedure of the random number is not limited to this. For example, when the game starts, the control unit 50 acquires these random numbers in a batch, and each random number may be stored in the storage area of the non-erasing memory 53 or the storage 54 when power failure occurs. In this type of situation, even when a power failure and the like occurs during a game, because the control unit 50 acquired the random number from the memory 53 or the storage 54 when the game started before the power failure occurred, when resuming the game after recovering from a power failure, the progress of the game can be reproduced. For example, when a game result obtaining a high payout is formed right before a power failure occurs, the player will be greatly dissatisfied if the progress of the game is not similar after recovering from a power failure. However, as mentioned above when the game starts all of the random numbers are acquired in a batch, and by saving these random numbers in the memory 53 or the storage 54, such great dissatisfaction can be avoided for the player because the progress of a game similar to before a power failure occurred can be reproduced after recovering from a power failure.

In another embodiment, the player may initiate a game through actuation of a spin button (or other button). After initiation of the game, the control unit 50 randomly determines the step position of all reels. The control unit 50 may perform the check for the trigger condition before the reels stop spinning, and thus has already determined the outcome of the game. However, the control unit 50 displays the outcome of the game in a step by step process as discussed above. Further, if the trigger condition has occurred with respect to the columns in the left plurality of columns, the check and evaluation of the outcome with respect to the columns in the right plurality of columns should be performed in certain embodiments. For example, if the bonus game is provided that is triggered based on the outcome, the outcome must be established to perform such an evaluation.

Further, in the embodiment, a bill/ticket is displayed as game value, and received by these bill/ticket identification devices (32, 55), and a form where a ticket is output by a printer unit 34 is described, but the present invention is not limited to this. The game value is a concept including tangible objects such as a coin, bill, coin, medal, ticket, and the like, or electronic data that has a value equivalent to these. For example, a coin is received by the coin accepter, and there may be a form where a coin is paid by a coin hopper. A player is identified and credit that is accumulated in an account on a server is used, there may be a form where credit is paid to an account, information of credit stored in a storage medium of a magnetic card, IC card and the like is read and used, and there may be a form where credit is paid by writing to the storage medium.

Further, in the embodiment when showing a free game provided as a bonus game, a bonus game that uses a different virtual reel strip 71 to 75 from a regular game may be provided. Further, there could be a provided a feature game according to a value of the random number acquired during a regular game.

Further, set conditions providing a bonus or feature game are not limited to trigger determination or line determination, for example there may be a configuration providing a bonus game when the bet number surpasses a predetermined value. There could be a configuration providing a bonus game according to a value of the random number acquired during a regular game.

Further, in the embodiment, a form providing a free game for a predetermined number of times as a bonus game is shown, and a bonus game that is not limited to a number of times may be provided. In this situation, there could be a configuration providing a bonus game until an end condition is satisfied, as an end condition is a combination of specified symbols, or a determining bonus game based on a random number.

Exemplary embodiments of a gaming device, a gaming system, and a method of providing an award to a player are described above in detail. The gaming device, system, and method are not limited to the specific embodiments described herein, but rather, components of the gaming device and/or system and/or steps of the method may be utilized independently and separately from other components and/or steps described herein. For example, the gaming device may also be used in combination with other gaming systems and methods, and is not limited to practice with only the gaming device as described herein. Rather, an exemplary embodiment can be implemented and utilized in connection with many other gaming system applications.

For instance, the present invention is applicable to a gaming system which is a combination of a community gaming system and individual gaming devices. In such a case, the individual gaming device and the community gaming device provide feature game cooperatively by providing 2nd display area on the community gaming system and 1st display area on the individual gaming devices et al., and the predetermined symbol is copied from the 1st display area on the individual gaming devices to 2nd display area on the community gaming system and the like.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine, comprising:

a cabinet;

a control panel mounted to the cabinet;

a display device mounted to the cabinet; and a control unit operably coupled to the control panel and the display device, the control unit including a processor programmed to execute an algorithm to display an animated sequence of computer-generated images on the display device including the steps of:

displaying a game screen on the display device including a plurality of reels displayed in a grid including a plurality of cells arranged in a plurality of rows and a plurality of columns and a plurality of paylines associated with the plurality of cells; and establishing a plurality of predefined subsets of cells, each of the plurality of predefined subsets of cells being associated with a different wager amount, the plurality of predefined subsets of the cells including a first subset of cells and a second subset of cells, wherein an associated number of cells in the second subset of cells is greater than an associated number of cells in the first subset of cells, and wherein a wager amount associated with the second subset of cells is greater than a wager amount associated with the first subset of cells;

receiving a player's selection of a subset of cells from the plurality of predefined subsets of cells via the control panel, highlighting the selected subset of cells on the game screen, and establishing a feature area including the selected subset of cells;

animating the plurality of reels to spin and stop to display a plurality of symbols in the grid; and displaying a game feature upon detecting the occurrence of a predetermined symbol appearing in the feature area with the reels stopped.

2. The gaming machine of claim 1, wherein the processor is programmed to execute the algorithm including the step of animating a frame around a perimeter of the selected subset of cells to highlight the selected subset of cells on the game screen.

3. The gaming machine of claim 1, wherein the processor is programmed to execute the algorithm including the step of establishing each predefined subsets of cells to include at least two rows of cells.

4. The gaming machine of claim 3, wherein the processor is programmed to execute the algorithm including the step of establishing at least one predefined subset of cells to include at least two cells from a corresponding column of the grid.

5. The gaming machine of claim 4, wherein the processor is programmed to execute the algorithm including the step of establishing the least one predefined subset of cells to include cells from a number of columns that is less than a total number of columns in the grid.

6. The gaming machine of claim 1, wherein the processor is programmed to execute the algorithm including the step of:

displaying the plurality of reels in a 3-4-4-4-3 grid including a first column, a second column, a third column, a fourth column, and a fifth column;

wherein first and fifth columns include three rows; and wherein the second, third, and fourth columns include four rows.

7. The gaming machine of claim 6, wherein the processor is programmed to execute the algorithm including the step of establishing the plurality of predefined subsets of cells to include cells displayed in the second, third, and fourth columns only.

8. A method of operating a gaming machine including a cabinet, a control panel mounted to the cabinet, a display device mounted to the cabinet, and a processor operably coupled to the control panel and the display device, the method including the processor performing an algorithm to display an animated sequence of computer-generated images on the display device including the steps of:

displaying a game screen on the display device including a plurality of reels displayed in a grid including a plurality of cells arranged in a plurality of rows and a plurality of columns and a plurality of paylines associated with the plurality of cells; and establishing a plurality of predefined subsets of cells, each of the plurality of predefined subsets of cells being associated with a different wager amount, the plurality of predefined subsets of the cells including a first subset of cells and a second subset of cells, wherein an associated number of cells in the second subset of cells is greater than an associated number of cells in the first subset of cells, and wherein a wager amount associated with the second subset of cells is greater than a wager amount associated with the first subset of cells;

receiving a player's selection of a subset of cells from the plurality of predefined subsets of cells via the control panel, highlighting the selected subset of cells on the game screen, and establishing a feature area including the selected subset of cells;

animating the plurality of reels to spin and stop to display a plurality of symbols in the grid; and displaying a game feature upon detecting the occurrence of a predetermined symbol appearing in the feature area with the reels stopped.

9. The method of claim 8, including the processor performing the algorithm including the step of animating a frame around a perimeter of the selected subset of cells to highlight the selected subset of cells on the game screen.

10. The method of claim 8, including the processor performing the algorithm including the step of establishing each predefined subsets of cells to include at least two rows of cells.

11. The method of claim 10, including the processor performing the algorithm including the step of establishing at least one predefined subset of cells to include at least two cells from a corresponding column of the grid.

12. The method of claim 11, including the processor performing the algorithm including the step of establishing the least one predefined subset of cells to include cells from a number of columns that is less than a total number of columns in the grid.

13. The method of claim 8, including the processor performing the algorithm including the step of:

displaying the plurality of reels in a 3-4-4-4-3 grid including a first column, a second column, a third column, a fourth column, and a fifth column;

wherein first and fifth columns include three rows; and wherein the second, third, and fourth columns include four rows.

14. The method of claim 13, including the processor performing the algorithm including the step of establishing the plurality of predefined subsets of cells to include cells displayed in the second, third, and fourth columns only.

15. A non-transitory computer-readable storage media having computer-executable instructions embodied thereon to operate a gaming machine including a cabinet, a control panel mounted to the cabinet, a display device mounted to the cabinet, and a processor operably coupled to the control panel and the display device, when executed by the processor the computer-executable instructions cause the processor to perform an algorithm to display an animated sequence of computer-generated images on the display device including the steps of:

displaying a game screen on the display device including a plurality of reels displayed in a grid including a plurality of cells arranged in a plurality of rows and a plurality of columns and a plurality of paylines associated with the plurality of cells; and establishing a plurality of predefined subsets of cells, each of the plurality of predefined subsets of cells being associated with a different wager amount, the plurality of predefined subsets of the cells including a first subset of cells and a second subset of cells, wherein an associated number of cells in the second subset of cells is greater than an associated number of cells in the first subset of cells, and wherein a wager amount associated with the second subset of cells is greater than a wager amount associated with the first subset of cells;

receiving a player's selection of a subset of cells from the plurality of predefined subsets of cells via the control panel, highlighting the selected subset of cells on the game screen, and establishing a feature area including the selected subset of cells;

animating the plurality of reels to spin and stop to display a plurality of symbols in the grid; and displaying a game feature upon detecting the occurrence of a predetermined symbol appearing in the feature area with the reels stopped.

16. The non-transitory computer-readable storage media of claim 15, wherein the computer-executable instructions cause the processor to perform the algorithm including the step of animating a frame around a perimeter of the selected subset of cells to highlight the selected subset of cells on the game screen.

17. The non-transitory computer-readable storage media of claim 15, wherein the computer-executable instructions cause the processor to perform the algorithm including the step of establishing each predefined subsets of cells to include at least two rows of cells.

18. The non-transitory computer-readable storage media of claim 17, wherein the computer-executable instructions cause the processor to perform the algorithm including the step of establishing at least one predefined subset of cells to include at least two cells from a corresponding column of the grid.

19. The non-transitory computer-readable storage media of claim 18, wherein the computer-executable instructions cause the processor to perform the algorithm including the step of establishing the least one predefined subset of cells to include cells from a number of columns that is less than a total number of columns in the grid.

20. The non-transitory computer-readable storage media of claim 15, wherein the computer-executable instructions cause the processor to perform the algorithm including the step of:

displaying the plurality of reels in a 3-4-4-4-3 grid including a first column, a second column, a third column, a fourth column, and a fifth column;

wherein first and fifth columns include three rows; and wherein the second, third, and fourth columns include four rows; and establishing the plurality of predefined subsets of cells to include cells displayed in the second, third, and fourth columns only.

* * * * *